Aug. 4, 1925.

E. DAVIS 1,548,582

MOTION PICTURE APPARATUS

Filed July 15, 1920

Witnesses:

Inventor:
Edward Davis.
by William A. Hardy

Aug. 4, 1925.
E. DAVIS
MOTION PICTURE APPARATUS
Filed July 15, 1920
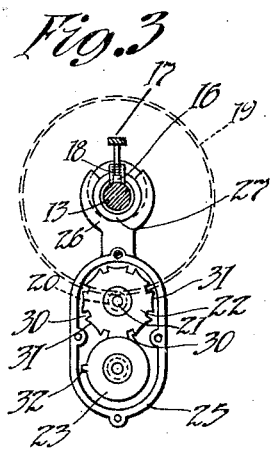
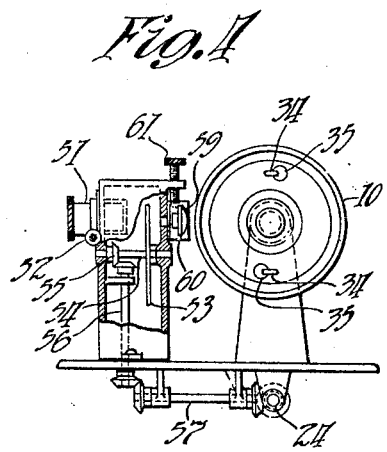
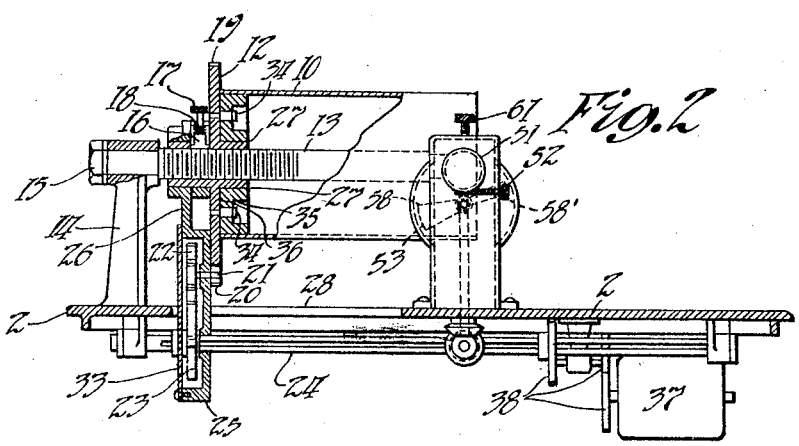

Patented Aug. 4, 1925.

1,548,582

UNITED STATES PATENT OFFICE.

EDWARD DAVIS, OF EAST ORANGE, NEW JERSEY, ASSIGNOR OF ONE-HALF TO WILLIAM A. HARDY, OF NEW YORK, N. Y.

MOTION-PICTURE APPARATUS.

Application filed July 15, 1920. Serial No. 396,379.

*To all whom it may concern:*

Be it known that I, EDWARD DAVIS, a citizen of the United States, and a resident of East Orange, in the county of Essex and State of New Jersey, have invented certain new and useful Improvements in Motion-Picture Apparatus, of which the following is a description.

My invention relates to motion picture apparatus, and especially to motion picture machines in which the picture record, either negative or positive, as the case may be, is taken or arranged on a curved surface, such as a cylindrical surface.

More particularly described, my invention as applied to a motion picture projecting apparatus, contemplates the arrangement of the series of positive pictures to be projected, on the surface of a cylindrical transparent carrier, the rays of light from a suitable source being properly directed to be transmitted through the picture record, the provision of effective means for rectifying or compensating the distortion of the projected image due to the curvature of the picture record, and eventually the projection of the corrected image through a suitable objective or projecting lens on to the usual distant flat screen, so that all parts of the projected image when properly focussed will be sharply and clearly defined on the screen. My invention may also be employed for recording pictures upon a sensitive film arranged upon a cylindrical surface, or upon the surface of a transparent cylinder with the emulsion placed directly thereon and properly sensitized, as well as for projecting pictures upon a canvas or other screen from a similar positive picture record. My invention further contemplates an intermittently rotating cylindrical picture record, with suitable means for causing the light which projects the images onto the screen such as a canvas, to pass through the said record only during the intervals when the same is at rest.

In accordance with my invention, the films or pictures are preferably disposed in the form of a spiral upon the surface of a cylinder of transparent material of a substantially uniform coefficient of refraction, such cylinder being preferably removably mounted upon a suitable actuating device having readily manipulated means for positioning and removing the cylinder, and for easily and quickly returning such cylinder to its initial or other desired position.

Other features of my invention will be more fully understood from the following description and from the accompanying drawings, in which:

Fig. 2 is an enlarged view in elevation, partly in section, of the cylindrical picture carrier and certain parts of the actuating device therefor;

Fig. 3 is a detail view in elevation showing the gearing for imparting intermittent movement to the cylindrical picture carrier;

Fig. 4 is a detail view in front elevation, partly in section, showing the cylindrical picture carrier, and a portion of the rectifying and projecting means;

Fig. 6 is an enlarged view of a suitable form of rectifying lens.

Figures 1, 5:
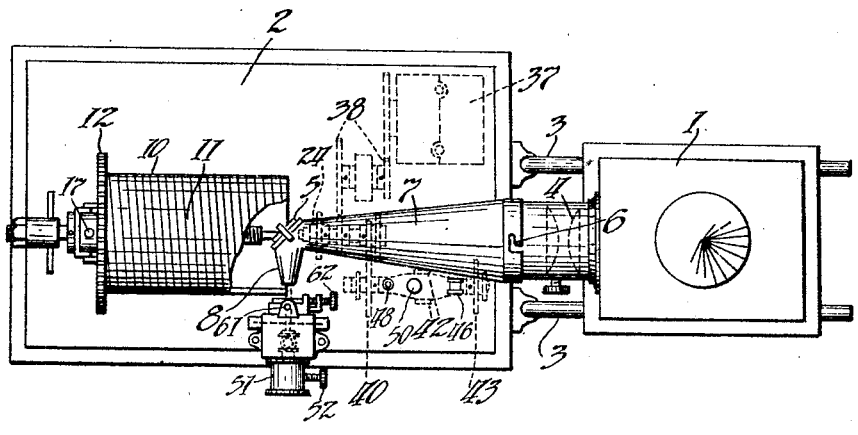
Fig. 1 is a plan view of a motion picture machine embodying my invention.
Fig. 5 is a somewhat enlarged detailed view, partly in elevation and partly in section, of the automatic speed regulating device.

Referring to the drawings, in which my invention is illustrated as embodied in a motion picture projecting machine, a suitable source of light, such as an arc lamp, Welsbach burner, incandescent lamp, or the like, is enclosed in a lamp housing 1 supported by a table 2, as by an adjustable bracket 3. The light from the lamp is suitably converged by a lens 4 upon a plane mirror 5, and as illustrated is reflected by the mirror 5 in a direction at right angles to the axis of said lens. The casing 6, in which the lens 4 is mounted, carries a frusto-conical tube 7 having at its front end a conical right angular extension 8, the mirror 5 being secured at the angle between the tube 7 and its extension 8, and the whole preferably being sealed to render the same light-proof. For purposes of disassembly, the tube 7 is secured to the casing 6 as by a bayonet joint or like connection. The axis of the tube 7 may be and preferably is in alignment with the axis of the cylinder 10 carrying the picture record as indicated in the drawings, but this precise arrangement is not essential, as long as the light is properly directed and concentrated to pass through the cylindrical picture record at right angles to the plane tangent to the same. The cylinder 10 on which the pictures 11 are preferably spirally arranged, is mounted on a rotatable disc 12 and is preferably of glass, but may be made of celluloid or of non-inflammable celluloid-like or similar substances. A threaded shaft 13 is secured at one end in a standard 14 formed on the table 2 as by means of a nut 15. The disc 12 is provided with a nut segment 16 normally held in engagement with the thread of the shaft 13 by a pin 17 and spring 18. By pulling the pin 17 upwardly against the spring 18 the threaded nut 16 is raised, and the disc 12 may then be manually moved along shaft 13 without being rotated. The disc 12 is provided on its outer periphery with gear-teeth 19 meshing with a pinion 20 fixed on a stud 21, to which a star wheel or gear 22 of a Geneva movement is also fixed. The pin wheel or gear 23 of the Geneva movement which coacts with the star wheel or gear 22 is splined to a shaft 24, the latter being preferably journaled in suitable bearings below the top of the table 2. The gear 20 and the Geneva movement for actuating the same are shown as carried by a casing 25 supported by a sleeve 26 which is rotatably mounted on the cylindrical hub 27 of the disc 12. Upon rotation of the disc 12 and cylinder 10 with consequent horizontal movement thereof along the shaft 13, the casing 25, gear 20, and the Geneva gears 22 and 23, are likewise horizontally moved along the shaft 24, the slot 28 in the table 2 permitting such movement. As shown more clearly in Fig. 3, the gear or star wheel 22 is provided with radial recesses 30 and intervening concave arc portions 31 and the gear or wheel 23 with a single tooth 32, whereby upon rotation of the gear 23 by the shaft 24 an intermittent or step-by-step movement is imparted to the gear 22, each movement of the gear 22 being equal to the distance between adjacent radial recesses 30. During the periods when the gear 22 is at rest, the same is locked in position by the engagement of concave arc portions 31 thereof with the periphery of gear 23. The casing 25 is preferably provided with a removable cover 33 screwed or otherwise secured thereon.

For readily positioning the cylinder 10 on the disc 12, I provide a number of angle lugs 34, the heads of which are adapted to enter recesses 35 in the base 36 of the cylinder, and upon turning the latter about the shaft 13 in the direction counter to that in which it is rotated in the operation of the device, the same will be locked securely in position, as is more clearly shown in Fig. 4. In order to insure perfect centralization and rigidity when positioning the cylinder 10 on the carrying disc 12, the latter is provided with an elongated hub 27 adapted to be inserted snugly into the central opening of the base 36 of the cylinder.

A suitable motor 37, such as an electric or spring-wound motor, is provided for driving the moving parts of the apparatus, and is preferably mounted on the under side of the table 2. Suitable speed multiplying gears 38 are connected between the motor 37 and the spline shaft 24, as indicated in Figs. 1 and 2. The speed of the shaft 24 is regulated by a suitable automatic speed controlling device comprising a gear 40 fixed to a shaft 41 and driven from a gear on the shaft 24, and a suitable braking means regulated for predetermined maximum speeds, as indicated in Fig. 5, including a brake disc 43 laterally movable along the shaft 41 by the weighted resilient members 42 connecting the gear 40 and brake disc 43. A brake lever 45, pivotally mounted at 46 on the table 2, is biased by a spring 47 to a position with the finger 48 formed on one end thereof projecting through an opening 49 in the table 2, and it will be apparent that upon downward movement of the finger 48 the mechanism will be arrested. As the gear 40 and disc 43 are rotated, the resilient weighted members 42 tend to fly outwardly under centrifugal action, and when the speed of rotation exceeds the speed determined by the adjustment of the screw 50, the members 42 will bring the disc 43 in contact with the brake lever 45 with sufficient force to produce the proper retardation.

My moving picture machine is provided with the usual projecting lens 51 which is adjustable as by means of the usual rack on the lens casing engaged by a pinion provided with an operating thumb screw 52. Mounted between the projecting lens 51 and the cylindrical picture record carrier is a shutter 53 mounted on a shaft 54 which is driven at the proper speed from shaft 24, as by means of the bevel gears 55, vertical shaft 56, horizontal shaft 57 and suitable intermediate gearing. The shutter 53 comprises a vane 58 which serves to momentarily cut off the light while the cylinder 10 is moved to shift any picture from projecting position and the subsequent picture thereon to projecting position, and a narrower vane 58' disposed at an angle of 180 degrees to the vane 58 and which in conjunction with the latter, serves the purpose of securing the desired optical effect upon the retina of the eye of the apparent absence of discontinuity of the pictures, thus preventing visual fatigue, as will be understood. If the vane 58' were omitted, there would be a greater effect of discontinuity. As indicated above, the light from the lamp or other source is directed through the particular picture and the corresponding portion of the cylindrical carrier 10 which are aligned with the opening of the conical tube portion 8 at any instant. Should the rays transmitted through such portions of the carrier and picture record now be passed directly through the usual objective or projecting lens 51, the picture or image thrown on the distant flat screen would be distorted due to the curvature of the picture record, as will be well understood, and of course it would be impossible to so adjust the objective 51 as to bring all parts of the projected image in focus on the screen. The distortion of the projected image, if the same were focussed on the screen at its median line, would be greatest at the top and bottom portions thereof; while, if the projected image were focussed on the screen at its upper and lower edges, the greatest distortion would be at the median portion thereof. To properly rectify such distortion of the projected image and to enable all parts thereof to be sharply focussed on the screen, I employ a lens 59 of a specially designed form, that illustrated being a double plano-convex cylindrical lens, mounted with the two lens portions extending cross-wise to each other, with the plane sides thereof in engagement, and with the convex side of one lens portion facing the cylindrical record carrier 10 and with the axis of the latter lens portion parallel to and in the same horizontal plane as the axis of said cylinder. The cylindrical lens portion which has its axis parallel to that of the cylindrical picture carrier 10 is preferably placed nearer to the record cylinder than the other lens portion, this preferable location being indicated in Fig. 4. With a lens of this form all portions of the picture being projected may be brought to proper focus on a flat screen. If but a single plano-convex cylindrical lens were used the light rays in passing through it would be focused to a line, but by using an additional plano-convex cylindrical lens placed cross-wise to the other as described, all the light rays transmitted through the picture are brought to proper focus at a point. With a combination lens of this character, the cylindrical surface of the plano-convex cylindrical lens portion which extends axially in the same direction as the record cylinder 10 is given a greater degree of curvature than the corresponding surface of the plano-convex cylindrical lens portion placed cross-wise thereto, in order to compensate for the curvature of the cylindrical picture carrier 10. That is, the cylindrical surface of the portion of the compound lens which has its axis extending parallel to the cylinder 10 will be given a curvature, depending upon the curvature of said cylinder, such as would in the absence of the portion of the lens placed cross-wise thereto focus rays transmitted through the picture being projected to a line; and the curvature of the cylindrical surface of said cross-wise lens portion will be such as to modify such rays still further and cause the same to be focused to a point. The double lens 59 is mounted in a vertical position in a frame 60 provided with a vertically adjusting screw 61 and a horizontally adjusting screw 62, thus providing an adjustable framing device. I have discovered that this lens compensating arrangement secures excellent results in practice, and is highly advantageous for obtaining unusual definition in the image projected upon the canvas or screen; my compensating arrangement being further advantageous in securing clear pictures on the canvas or screen, notwithstanding variations in composition or non-homogeneity of the record cylinder.

When my motion picture machine is used for recording pictures on a sensitized film or cylinder, the parts will be protected by a suitable cover or enclosure from outside sources of light, and such other necessary precautions taken, as will be understood, for obtaining a picture of desired characteristics.

The operation of my motion picture machine will be clear from the preceding description together with the following remarks. The rotation of the shaft 24 by the motor 37 will be controlled by the centrifugal speed regulator comprising the brake disc 43 and brake lever 45, and upon such rotation of the shaft 24 intermittent rotary movement will be imparted to the disc 12 by the Geneva gears 23 and 22, whereby the cylindrical record carrier 10 will be moved step-by-step at the proper intervals, the distance of one picture unit, and along a spiral path determined by the pitch of the thread on the shaft 13. When the proper adjustments are once made, the pictures on the cylinder 10 will be brought consecutively in register with the projecting lens 51 and the double compensating lens 59. It will thus be seen that the rays of light forming the images of the pictures projected on the screen, pass through the cylinder 10 and picture record during those intervals when the cylinder is at rest. By this arrangement sharper and more clearly defined images are obtained than in arrangements where the light forming the images passes through a continuously moving record. The proper speed of the shutter 53 is obtained by a suitable choice of the gearing intermediate the shaft 54 carrying the shutter and the driving shaft 24. After any picture record has been projected upon the screen, the same record or any portion thereof may be repeated upon releasing the nut segment 16, and then moving the disc cylinder 10, disc 12 and connecting gearing either to an intermediate position or to the extreme left-hand or initial position as shown in Fig. 2, depending on whether it is desired to repeat only a portion of the record or the entire record. It will be apparent that my compensating or rectifying means is adjustable simultaneously with the framing device and independently of the other parts of my machine, thereby affording the advantages of simultaneously compensating for and framing the pictures being projected, and also of securing proper focusing of the pictures projected from different records and when projecting on screens at different distances from the machine, without disturbing the adjustment of the compensating or rectifying means.

It will be understood that many changes and modifications may be made in the specific embodiment of the invention shown and described herein without departing from the spirit of my invention or the scope of the appended claims.

Having now fully described my invention, what I claim as new and desire to protect by Letters Patent of the United States is as follows:

1. In a motion picture machine, the combination of a record carrier of transparent material having a curved surface, means for directing light to be transmitted through said carrier and means for compensating for the distortion of the projected image due to the curvature of the carrier comprising a lens which with respect to the direction of travel of the light, is disposed beyond the carrier, said lens being in operative relation to the carrier and having a surface curved oppositely to the curved surface of the portion of the carrier with which the lens co-operates.

2. In a motion picture machine, the combination of a record carrier formed of transparent material and circular in cross-section, means for directing light to be transmitted through the same, means for compensating for the distortion of the projected image due to the curvature of the carrier comprising a lens in operative relation to the carrier and having a cylindrical surface, said lens, with respect to the direction of travel of the light, being disposed beyond the portion of the carrier through which the light is transmitted, the curvature of the cylindrical surface of the lens being opposite to the curvature of that portion of the carrier with which the lens co-operates.

3. In a motion picture machine, the combination of a record carrier formed of transparent material and circular in cross-section, means for directing light to be transmitted through the same, means for compensating for the distortion of the projected image due to the curvature of the carrier comprising a lens in operative relation to the carrier and which with respect to the direction of travel of the light, is disposed beyond the portion of the carrier through which the light is transmitted, said lens having a cylindrical surface, the curvature of which is opposite to the curvature of that portion of the carrier with which the lens co-operates, the axis of the cylindrical surface of the lens being parallel to the axis of said carrier.

4. In a motion picture machine, the combination of a record carrier formed of transparent material and circular in cross-section, means for directing light to be transmitted through the same, means for compensating for the distortion of the projected image due to the curvature of the carrier comprising a convex cylindrical lens in operative relation to the carrier, and which with respect to the direction of travel of the light, is disposed beyond the portion of the carrier through which the light is transmitted, the curvature of the cylindrical surface of the lens being opposite to the curvature of that portion of the carrier with which the lens co-operates.

5. In a motion picture machine, the combination of a record carrier formed of transparent material and circular in cross-section, means for directing light to be transmitted through the same, means for compensating for the distortion of the projected image due to the curvature of the carrier comprising a plano-convex cylindrical lens in operative relation to the carrier, and which with respect to the direction of travel of the light, is disposed beyond the portion of the carrier through which the light is transmitted, the curvature of the cylindrical surface of the lens being opposite to the curvature of that portion of the carrier with which the lens co-operates.

6. In a motion picture machine, the combination of a record carrier formed of transparent material and circular in cross-section, means for directing light to be transmitted through the same, means for compensating for the distortion of the projected image due to the curvature of the carrier comprising a convex cylindrical lens in operative relation to the carrier, and which with respect to the direction of travel of the light, is disposed beyond the portion of the carrier through which the light is transmitted, the curvature of the cylindrical surface of the lens being opposite to the curvature of that portion of the carrier with which the lens co-operates, the axis of the cylindrical surface of the lens being parallel to the axis of said carrier.

7. In a motion picture machine, the combination of a record carrier of transparent material having a curved surface, means for directing light to be transmitted through said carrier and means for compensating for the distortion of the projected image due to the curvature of the carrier comprising a lens which with respect to the direction of travel of the light, is disposed beyond the carrier, said lens being in operative relation to the carrier and having a surface curved oppositely to the curved surface of the portion of the carrier with which the lens co-operates, the axes of the curved surfaces of the record carrier and the lens being parallel.

8. In a motion picture machine, the combination of a record carrier formed of transparent material and circular in cross-section, means for directing light to be transmitted through the same, means for compensating for the distortion of the projected image due to the curvature of the carrier comprising a double cylindrical lens, the axes of the two cylindrical portions of the lens extending transversely of each other.

9. In a motion picture machine, the combination of a record carrier formed of transparent material and circular in cross-section, means for directing light to be transmitted through the same, means for compensating for the distortion of the projected image due to the curvature of the carrier comprising a double cylindrical lens, the axes of the two cylindrical portions of the lens extending transversely of each other, the axis of one cylindrical portion of the lens being parallel with the axis of said carrier.

10. In a motion picture machine, the combination of a record carrier formed of transparent material and circular in cross-section, means for directing light to be transmitted through the same, means for compensating for the distortion of the projected image due to the curvature of the carrier comprising a double cylindrical lens, the axes of the two cylindrical portions of the lens extending transversely of each other, a cylindrical surface of the portion of the double lens adjacent the carrier being curved oppositely to that portion of the carrier with which the lens co-operates.

11. The combination of a means adapted to carry a series of pictures, means for directing light upon a curved portion of said carrier means to project images, means for correcting distortion of the projected images due to the curvature of said portion of the carrier means comprising a double cylindrical lens operatively associated with said carrier means, the axes of the two cylindrical portions of the lens extending transversly of each other.

12. The combination of means adapted to carry a series of pictures, means for directing light upon a curved portion of said carrier means to project images, means for correcting distortion of the projected images due to the curvature of said portion of the carrier means comprising a double cylindrical lens operatively associated with said carrier means, the axes of the two cylindrical portions of the lens extending transversely of each other and the axis of one of the cylindrical surfaces of said lens being parallel to the axis of the said curved portion of the carrier means.

13. The combination of a cylinder adapted to carry a series of pictures, means for directing light upon said cylinder to project images, means for correcting distortion of the projected images due to the curvature of said cylinder comprising a double plano-convex cylindrical lens operatively associated with said cylinder, the axes of the two cylindrical portions of the lens extending transversely of each other and the axis of one of the cylindrical surfaces of said lens being parallel to the axis of said cylinder.

14. In a motion picture machine, the combination of a cylinder adapted to carry a series of pictures, means for directing light upon the said cylinder to project images, and means operatively associated with said cylinder for compensating for distortion of the projected images due to the curvature of the cylinder comprising a lens which with respect to the direction of travel of the light, is disposed beyond the portion of the cylinder upon which the light is directed, said lens having a cylindrical surface facing and curved oppositely to that portion of said cylinder with which the lens co-operates.

15. In a motion picture machine, the combination of a cylinder adapted to carry a series of pictures, means for directing light upon the said cylinder to project images, and means operatively associated with said cylinder for compensating for distortion of the projected images due to the curvature of the cylinder comprising a convex cylindrical lens which with respect to the direction of travel of the light, is disposed beyond the portion of the cylinder upon which the light is directed, said lens having its convex cylindrical surface facing and curved oppositely to that portion of said cylinder with which the lens co-operates.

16. In a motion picture machine, the combination of a cylinder adapted to carry a series of pictures, means for directing light upon the said cylinder to project images, and means operatively associated with said cylinder for compensating for distortion of the projected images due to the curvature of the cylinder comprising a lens which with respect to the direction of travel of the light, is disposed beyond the portion of the cylinder upon which the light is directed, said lens having a cylindrical surface facing and curved oppositely to that portion of said cylinder with which the lens co-operates, the axis of said cylindrical surface being parallel with the axis of said cylinder.

17. In a motion picture machine, the combination of a cylinder adapted to carry a series of pictures, means for directing light upon the said cylinder to project images, and means operatively associated with said cylinder for compensating for distortion of the projected images due to the curvature of the cylinder comprising a plano-cylindrical lens which with respect to the direction of travel of the light, is disposed beyond the portion of the cylinder upon which the light is directed, said lens having a cylindrical surface the curvature of which is opposite to that portion of said cylinder with which the lens co-operates.

This specification signed this 13 day of July 1920.

EDWARD DAVIS.